(12) United States Patent
Bohnet et al.

(10) Patent No.: US 8,997,058 B2
(45) Date of Patent: Mar. 31, 2015

(54) METHOD FOR AUTOMATICALLY GENERATING A TRACE DATA SET FOR A SOFTWARE SYSTEM, A COMPUTER SYSTEM, AND A COMPUTER PROGRAM PRODUCT

(75) Inventors: Johannes Bohnet, Berlin (DE); Juergen Doellner, Berlin (DE)

(73) Assignee: Software Diagnostics Technology GmbH, Potsdam (DE)

( * ) Notice: Subject to any disclaimer, the term of this patent is extended or adjusted under 35 U.S.C. 154(b) by 0 days.

(21) Appl. No.: 13/637,066

(22) PCT Filed: Mar. 24, 2011

(86) PCT No.: PCT/EP2011/001532
§ 371 (c)(1),
(2), (4) Date: Nov. 21, 2012

(87) PCT Pub. No.: WO2011/116987
PCT Pub. Date: Sep. 29, 2011

(65) Prior Publication Data
US 2013/0091387 A1 Apr. 11, 2013

Related U.S. Application Data

(60) Provisional application No. 61/318,075, filed on Mar. 26, 2010, provisional application No. 61/318,052, filed on Mar. 26, 2010.

(51) Int. Cl.
*G06F 9/44* (2006.01)
*G06F 9/45* (2006.01)
*G06F 11/36* (2006.01)

(52) U.S. Cl.
CPC ........ *G06F 11/3636* (2013.01); *G06F 11/3644* (2013.01); *G06F 11/3612* (2013.01); *G06F 11/3624* (2013.01)
USPC .......................................... 717/128; 717/158

(58) Field of Classification Search
CPC ............ G06F 11/3636; G06F 11/3466; G06F 2201/865
USPC .................................................. 717/128, 158
See application file for complete search history.

(56) References Cited

U.S. PATENT DOCUMENTS 6,083,281 A * 7/2000 Diec et al. ..................... 717/128
7,137,105 B2 * 11/2006 Madsen et al. ................ 717/128

(Continued)

OTHER PUBLICATIONS

Bohnet et al., "Projecting Code Changes onto Execution Traces to Support Localization of Recently Introduced Bugs," ACM, Mar. 2009, 5pg.*

(Continued)

*Primary Examiner* — Ryan Coyer
(74) *Attorney, Agent, or Firm* — Sutherland Asbill & Brennan LLP

(57) ABSTRACT

The invention relates to a method, a computer system, and a computer program product for automatically generating a trace data set for a software system on a computer system. The method includes the step of providing a software system comprising a source code. Binary code is provided by compiling the source code by inserting a plurality of tracing instructions into the binary code. The tracing instructions initiate trace data generation during runtime of the software system. The method also includes modifying the binary code by replacing at least one tracing instruction of the plurality of tracing instructions with a neutral instruction. The modified binary code is run by activating trace data generation by re-replacing the neutral instruction with the at least one tracing instruction. The method further includes recording the trace data set. The recording step is initiated by the at least one tracing instruction.

16 Claims, 8 Drawing Sheets

(56) References Cited

U.S. PATENT DOCUMENTS

| | | | |
|---|---|---|---|
| 7,389,494 B1* | 6/2008 | Cantrill | 717/125 |
| 7,950,001 B2* | 5/2011 | Panchamukhi et al. | 717/124 |
| 8,312,435 B2* | 11/2012 | Wygodny et al. | 717/130 |
| 2002/0199172 A1 | 12/2002 | Bunnell | |
| 2004/0025145 A1* | 2/2004 | Dawson | 717/129 |
| 2008/0126828 A1 | 5/2008 | Girouard | |
| 2009/0037887 A1* | 2/2009 | Chavan | 717/128 |

OTHER PUBLICATIONS

Caubet et al., "A Dynamic Tracing Mechanism for Performance Analysis of OpenMP Applications," Springer-Verlag, 2001, 15pg.*

Dubey et al., "Profile-Driven Generation of Trace Samples," IEEE, 1996, 8pg.*

Odom et al., "Using Dynamic Tracing Sampling to Measure Long Running Programs," IEEE, 2005, 10pg.*

Johannes, Bohnet et al., "Projecting Code Changes Onto Execution Traces to Support Localization of Recently Introduced Bugs," Proceedings of the 2009 ACM Symposium on Applied Computing, Mar. 8-12, 2009, pp. 438-442, New York, NY.

Dubey, P.K. et al., "Profile-Driven Generation of Trace Samples," Proceedings of the International Conference on Computer Design, ICCD, VLSI in Computers and Processors, Austin, Oct. 7-9, 1996 [proceedings of the International Conference on Computer Design, ICCD, VLSI in Computers and Processors], Los Alamitos, Oct. 7, 1996, pp. 217-224.

Pothier, G. et al., "Back to the Future: Omniscient: Debugging," IEEE Software, IEEE Service Center, Los Alamitos, CA, vol. 26, No. 6, Nov. 1, 2009, pp. 78-85.

International Search Report for PCT/EP2011/001532 mailed May 23, 2011.

Written Opinion of the International Searching Authority for PCT/EP2011/001532 mailed May 23, 2011.

* cited by examiner

```
void transform3DScene ( Scene scene , Vector center , double factor)
{
  SceneObjs objs = scene . getObjs ( ) ;
  foreach ( obj in objs ) {
    transformSceneObj ( obj , center, factor ) ;
  }
} void transformSceneObj ( SceneObj obj , Vector center, double factor )
{
  Vertices vertices = obj . getVertices ( ) ;
  foreach ( vertex in vertices ) {
    transformVertex ( vertex , center , factor ) ;
  }
} void transformVertex ( Vertex v , Vector center, double factor )
{
  Vector pos = v . getVector ( ) ;

double newXPos = ... // calculate new x Position
  double newYPos = ... // calculate new y Position
  double newZPos = ... // calculate new z Position v . setPos ( 0 , newXPos ) ;
  v . setPos ( 1 , newYPos ) ;
  v . setPos ( 2 , newZPos ) ;
}
```

Fig. 6

METHOD FOR AUTOMATICALLY GENERATING A TRACE DATA SET FOR A SOFTWARE SYSTEM, A COMPUTER SYSTEM, AND A COMPUTER PROGRAM PRODUCT

CROSS-REFERENCE TO RELATED APPLICATIONS

This is a submission pursuant to 35 U.S.C. §154(d)(4) to enter the national stage under 35 U.S.C. §371 for PCT/EP2011/001532, filed Mar. 24, 2011. Priority is claimed under 35 U.S.C. §119(a) and 35 U.S.C. §365(b) to U.S. Patent Application Nos. 61/318,052 and 61/318,075, each filed Mar. 26, 2010. The subject matter of international application no. PCT/EP2011/001,532 and U.S. Patent Application Nos. 61/318,052 and 61/318,075 are expressly incorporated herein by reference.

FIELD OF THE INVENTION

The invention relates to new technologies in the field of software system diagnosis, especially in the field of tracing technology.

BACKGROUND OF THE INVENTION

A large fraction of the costs in a software system's life cycle is spent on its maintenance. Estimates of 85 to 90% were reported. One important reason why software maintenance tends to be costly is that long-living software systems such as legacy software systems can only be understood in part, and an up-to-date documentation describing the system's structure and behavior is rarely available. Hence, developers, including any person participating in software development and maintenance that operates on source code, devote up to 50% of their time to trying to understand the system's implementation. Likewise, more recent studies emphasize the importance of program understanding during maintenance (Basili, Evolving and packaging reading technologies, Journal of Systems and Software 38 (1997), No. 1, pp. 3-12; Ko et al., Information Needs in Collocated Software Development Teams, Proceedings of the 29th International Conference on Software Engineering, IEEE Computer Society, 2007, pp. 344-353).

One of the many reasons why program understanding is time consuming is that the system's internal behavior can only be inspected in parts. Developers need to re-establish the links between the external, visible behavior and the system's implementation. Known developer tools support developers by "showing" the inner processes either by providing information on the system's state at a single point in time (e.g., symbolic debuggers) or by providing time aggregated overviews (e.g., profilers). While these tools help developers to acquire an understanding of the system's execution, reconstructing the execution history needs to be done mentally—a cognitively demanding task.

The visualization of execution traces, i.e., sequences of function calls, represents an approach to help developers to understand a complex system's structure and behavior (Cornelissen et al., Understanding Execution Traces Using Massive Sequence and Circular Bundle Views, Proc. 15th IEEE International Conference on Program Comprehension ICPC '07, 2007, pp. 49-58; Be Pauw et al., Execution Patterns in Object-Oriented Visualization, Proceedings of the Conference on Object-Oriented Technologies and Systems, USENIX, 1998, 219-234; Renieris et al., Almost: Exploring Program Traces, Workshop on New Paradigms in Information Visualization and Manipulation, 1999, pp. 70-77). Trace visualization reveals the participating functions, their relationships, and their call order while the system runs and exhibits a specific externally visible behavior. In practice, execution trace visualization captures the sequence of function calls over time, analyzes and abstracts that data, and derives visual representations that permit developers to analyze the system's structure and behavior. Throughout the present application, the term trace is used synonymously with the term execution trace.

There are a number of commercial and academic program comprehension tools available that have been adopted by developers for daily use in an industrial software maintenance setting. However, these do not focus on trace visualization. The main reason for this is that building trace visualization tools encounters major scalability issues: First, it is computationally difficult to process the large amount of data that is typically produced when logging system behavior. Second, it is difficult to explore the vast amount of runtime data—a cognitive scalability issue. For example, capturing the behavior of the Google Chrome web browser for five seconds while it is downloading and displaying a web page involves more than 10 million function calls.

For man maintenance tasks, analysis tools and systems already exist. They allow developers to identify specific artifacts of the software system (e.g., functions, classes, files) that are relevant to the given maintenance task. Typically, the resulting artifacts contain false positives, i.e., artifacts not relevant to the task at hand. Identifying the true positives tends to be time consuming, especially if one needs to "dig into code" to distinguish between false and true positives. Applying trace visualization in these situations has the following benefits:

Trace visualization can often be applied as an intermediate step after having received the set of artifacts and before analyzing the code manually to verify that an artifact is relevant to the given maintenance task. Trace visualization facilitates comprehension of the execution context of the artifacts and helps to eliminate false positives.

Combining trace visualization with other analysis tools and systems helps to master the scalability issue. The resulting artifacts provide developers with precise entry points for trace exploration. They may perform detailed trace analysis without having to search for maintenance task relevant parts in the trace via a top-down exploration.

Applying information visualization techniques in the domain of software engineering is referred to as software visualization. Software sometimes is inherently intangible and invisible. The goal of software visualization is to provide computer images which evoke mental images for comprehending software better.

Software visualization may be regarded as a useful and powerful technique for helping programmers understand large and complex programs. Likewise, the need for software visualization has been emphasized when having to cope with challenging development processes: A basic necessity in this context are methods and tools to improve program understanding. An accepted and powerful technique to manage the various stages of the software lifecycle—especially during specification, design, programming, and program analysis—is visualization.

A broad definition of software visualization may be given as follows: Software visualization refers to the use of various visual means in addition to text in software development. The various forms of development means include graphics, sound, color, gesture, animation, etc. Software development life cycle involves the activities of project management, requirement analysis and specification, architectural and system design, algorithm design, coding, testing, quality assurance, maintenance, and, if necessary, performance tuning.

Price et al. (A Principled Taxonomy of Software Visualization, Journal of Visual languages and Computing 4 (1993), No. 3, pp. 211-266) define the term software visualization as follows: Software visualization is the use of the crafts of typography, graphic design, animation, and cinematography with modern human-computer interaction and computer graphics technology to facilitate both human understanding and effective use of computer software.

Also, the following definition may be proposed: Software visualization is a representation of computer programs, associated documentation and data, that enhances, simplifies and clarifies the mental representation the software engineer has of the operation of a computer system. A mental representation corresponds to any artifact produced by the software engineer that organizes his or her concept of the operation of a computer system.

A more restrictive definition of software visualization may be given: Software visualization is the visualization of artifacts related to software and its development process. In addition to program code, these artifacts include requirements and design documentation, changes to the source code, and bug reports, for example. Researchers in software visualization are concerned with visualizing the structure, behavior, and evolution of software.

SUMMARY OF THE INVENTION

It is an object of the invention to provide new technologies in the field of software system diagnosis, especially in the field of tracing technology. It is a further object to provide a scalable and robust technique for software systems, preferably for a C/C++ software system, which is easily integrated into complex build processes and applies to a wide range of platforms.

According to the invention a method and a computer systems for automatically generating a trace data set for a software system according to claims 1 and 15, respectively, are provided. In addition, a computer program product according to claim 16 is provided. Advantageous developments of the invention are disclosed in dependent claims.

According to one aspect of the invention, a method for automatically generating a trace data set for a software system on a computer system is provided, the method comprising steps of:
providing a software system comprising a source code,
providing a binary code by compiling the source code, wherein the step of compiling comprises a step of inserting a plurality of tracing instructions into the binary code, each of the tracing instructions configured to initiate trace data generation during runtime of the software system,
providing a modified binary code by modifying the binary code, wherein the step of modifying comprises a step of replacing at least one tracing instruction of the plurality of tracing instructions with a neutral instruction, and
running the modified binary code, wherein the step of running comprises steps of activating trace data generation by re-replacing the neutral instruction with the at least one tracing instruction, and recording a trace data set, the step of recording being initiated by the at least one tracing instruction.

According to another aspect of the invention, a computer system for automatically generating a trace data set for a software system is provided, the computer system comprising:
a software system comprising a source code,
an compiler module configured to provide a binary code by compiling the source code and to insert into the binary code a plurality of tracing instructions, each of the tracing instructions configured to initiate trace data generation during runtime of the software system,
a modification module configured to provide a modified binary code by modifying the binary code and to replace at least one tracing instruction of the plurality of tracing instructions with a neutral instruction, and
a processor module configured to run the modified binary code, wherein the processor module is further configured to activate trace data generation by re-replacing the neutral instruction with the at least one tracing instruction, and record a trace data set, the step of recording being initiated by the at least one tracing instruction.

It is preferred to have the call tracing instructions implemented as assembler call instructions.

In a preferred embodiment, the step of inserting comprises a step of inserting a plurality of call instructions into the binary code.

In another preferred embodiment, the step of inserting comprises a step of inserting each of the tracing instructions at the beginning of a part of the binary code assigned to a function.

In an advanced embodiment of the invention, the step of replacing comprises a step of replacing the at least one tracing instruction of the plurality of tracing instructions by a NOP instruction.

Preferably, the step of modifying the binary code comprises, prior to the step of replacing, a step of receiving a user selection for the at least one tracing instruction of the plurality of tracing instructions.

In still a further embodiment of the invention, the step of replacing comprises a step of using one or more debugger facilities for replacement of the at least one tracing instruction of the plurality of tracing instructions.

A further development of the invention is that the step of modifying comprises the following steps of checking for a process thread having its instruction pointer pointing at a neutral process instruction, and, if the instruction pointer is pointing at the neutral process instruction, stepping forward the process thread until its instruction pointer is no longer pointing at the neutral process instruction.

In a preferred embodiment, the step of running further comprises steps of
performing an analysis of a present trace data set,
deriving a characterizing parameter from the analysis, the characterizing parameter assigned to the tracing instruction or at least one other tracing instruction out of the plurality of tracing instructions,
comparing the characterizing parameter against a threshold criterion also assigned to the at least one tracing instruction and/or the at least one other tracing instruction, and
if the characterizing parameter fulfills the threshold criterion, excluding the at least one tracing instruction or the at least one other tracing instruction from further trace data generation.

In a further preferred embodiment, the step of excluding comprises a step of replacing the at least tracing instruction or the at least one other tracing instruction by the neutral instruction or another neutral instruction.

In another embodiment of the invention, the step of performing the analysis comprises a step of performing a statistical analysis of the present trace data set, thereby, deriving a statistical parameter for the at least tracing instruction or the at least one other tracing instruction.

In still another preferred embodiment, the step of deriving the statistical parameter comprises a step of deriving a frequency of processing parameter for the tracing instruction.

In still some other embodiment of the invention, the step of comparing the characterizing parameter comprises a step of identifying a function implementation data set assigned to the at least one tracing instruction or the at least one other tracing instruction as a massively called function implementation data set if the characterizing parameter fulfils fulfills the threshold criterion. As used herein, the identification as a massively called function, preferably, shall be made when the number of calls assigned to the function is greater than the number of calls defined by the threshold criterion.

The method may further comprise a step of dynamically deriving the threshold criterion during runtime of the binary code.

In still another advanced embodiment of the invention, the step of performing the analysis comprises a step of classifying at least two tracing instructions of the plurality of tracing instructions by identifying a first class of one or more first tracing instructions and assigning a first threshold criterion to the first class, and by identifying a second class of one or more second tracing instructions different from the one or more first tracing instructions and assigning a second threshold criterion different from the first threshold criterion to the second class. The classes may be provided as frequency classes assigned to different frequency criteria, namely different frequency values and/or different frequency ranges. The frequency criterion preferably refers to a frequency of processing one or more tracing instructions. The step of classification may be performed dynamically during runtime, thereby implementing a dynamic identification of the first and second classes. The above embodiment allows for defining different tracing criteria for different functions of the software system. In a preferred embodiment, there is a first function called by a first tracing instruction (first class) of the software system analyzed by tracing. A first threshold criterion is assigned to the first tracing instruction. In addition, there is a second function (second class) of the software system which is different from the first function and which is related to a second tracing instruction. For the second tracing instruction a second threshold criterion is set which is different from the first threshold criterion. Of course, there may be more than two different threshold criteria. At least one of the first and second class may comprise more than one function.

In another embodiment, aspects of the invention may be defined as follows. A method is provided for automatically generating a trace data set from a computer system comprising a plurality of function implementation data sets, wherein (i) with the compilation of the system source code additional instructions, especially assembler call instructions are inserted in at least one function implementation data set, (ii) after compilation the additional processor instructions are automatically replaced at least partially with neutral instructions, e.g., NOP instructions, in the binary executable, (iii) at runtime a subset of the inserted instructions is replaced with the original instructions to activate generation of event data sets for the respective function implementation data sets, and (iv) event data sets indicating that a function implementation data set is processed by the CPU are automatically produced, and especially also archived, the set of generated event data sets forms the trace data set.

In a preferred embodiment, the additional instructions comprise at least one of control redirecting instructions and/or generating trap generating instructions. According to another embodiment, at least one neutral instruction, e.g., a NOP instruction, is inserted at the beginning of the binary executable. It may be preferable to facilitate the replacement of at least one neutral instruction, e.g., a NOP instruction, by a debugger.

In still another embodiment, for automatically detecting and excluding from tracing at least one function implementation data set at runtime, (a) a statistical analysis of the runtime behavior of at least one function implementation data set is performed during tracing, (h) at least one value derived from the statistical analysis of the at least one function implementation data set is compared against at least one threshold criterion, and (c) if the at least one value derived from the statistical analysis fulfills the at least one threshold criterion, this at least one function implementation data set is excluded from further tracing.

The value derived from the statistical analysis comprises the frequency of being processed by the CPU of at least one function implementation data set. The at least one threshold criterion may be a frequency value vmax. In an embodiment, the statistical analysis of function implementation data sets comprises the automatic generation of a frequency classification and/or a dynamic generation of at least one threshold criterion.

In still some other embodiment, a system for automatically generating a trace data set from a computer system comprising a plurality of function implementation data sets is provided, wherein (i) with the compilation of the system source code additional instructions, especially assembler call instructions are inserted in at least one function implementation data set, (ii) after compilation the additional processor instructions are automatically replaced at least partially with neutral instructions, e.g., NOP instructions, in the binary executable, (iii) at runtime a subset of the inserted instructions is replaced with the original instructions to activate generation of event data sets for the respective function implementation data sets, and (iv) event data sets indicating that a function implementation data set is processed by the CPU are automatically produced, and especially also archived, the set of generated event data sets forms the trace data set.

BRIEF DESCRIPTION OF THE FIGURES

In the following, the invention will be described in further detail, by way of example, with reference to different embodiments. The figures show.

DETAILED DESCRIPTION OF THE EXEMPLARY EMBODIMENTS

Visualization Technology

Figure 1:
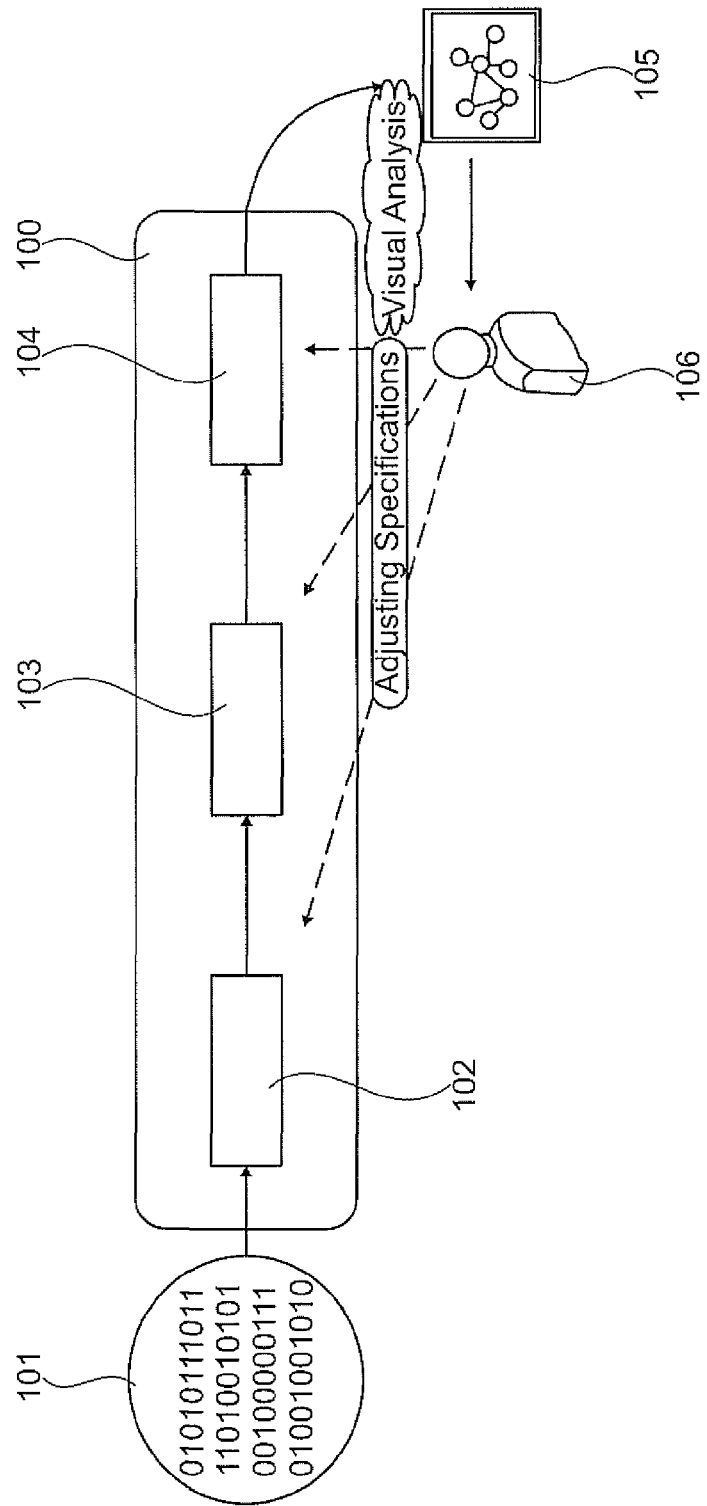
FIG. 1 a schematic representation of a sequence of successive steps that derive visual representations from raw data, FIG. 2 a schematic representation of a trace forming a tree, FIG. 3 a schematic representation of a trace visualization process, FIG. 4 a schematic representation of an edit-build-run cycle, FIG. 5 a schematic representation of a process of inserting a call function in a binary code and replacing the call function by a NOP instruction, FIG. 6 a schematic representation of an implementation of a transform functionality, FIG. 7 a schematic representation of a library for registering and serializing function entry/exit events, and FIG. 8 a histogram of performance measurements with and without NOP instructions.

A software visualization process is modeled conceptually as a sequence of successive steps that derive visual representations from raw data. This concept represented by the visualization pipeline is illustrated schematically in FIG. 1.

The visualization process is conceptually divided into steps performed in a visualization system 100:
  i) Filtering: First it is operated on raw data 101 in a filtering step 102. Operations on the raw data 101 include interpolating missing parts of the raw data 101, computing data characteristics such as extreme values or gradients, cleaning data from noise, and selecting a subset of the data.
  ii) Mapping: A mapping step 103 transforms the filtered raw data into a geometry model. That is, data values are mapped onto geometric primitives, the primitives' attributes (e.g., color), and their layout (i.e., relative positions). For instance, scene graph representations may be used.
  Rendering: A rendering step 104 transforms mapped data into visual representations which may be shown on a screen 105. For 3D geometry models a virtual camera defines the 3D view that can be represented by a projective transformation on the view frustum.

For interactive visualization, a user 106 triggers the visualization process in a cyclic way: The image that is created by the rendering step 104 is shown, and the user can gather insights into the underlying data. Typically, the user can adjust the specifications that control the filtering 102, mapping 103, and rendering step 104.

Following, definitions for traces are given. Next, a model for the trace visualization process is elaborated on. Finally, it is discussed how information on the structural decomposition of the system is combined with trace data.

A broad definition of the term trace is given, for example, by Clements et al.: "Traces are sequences of activities or interactions that describe the system's response to a specific stimulus when the system is in a specific state. These sequences document the trace of activities through a system described in terms of its structural elements and their interactions." In the present application, a more restrictive definition is followed that is concerned with control flow on function granularity. In different programming paradigms different terms for function are used. Throughout the present application, the term function stands as placeholder for all of these terms, e.g., procedure, subroutine, method, etc. Traces result both from recording the execution of single-threaded and multi-threaded software systems. In the case of multi-threaded systems, however, multi traces are created—one trace per thread. A trace is a sequence of events that stand for a software system's control flow entering or leaving a function. As entry and exit events occur in pairs forming a function call, a trace can be interpreted as sequence of nested function calls.

Function level abstraction plays an important role in reverse engineering and program comprehension: Functions are the smallest named and semantics conveying execution units. Control flow captured on function level abstraction helps developers to understand delocalized plans. Function-based representations of a system are essential for understanding a system on an architectural level of abstraction. They represent the system in a more coarse-grained way than abstract syntax trees (AST), control flow graphs (CFG), or data flow graphs (DFG).

Specific reverse engineering techniques and tasks may require a representation of system behavior which goes beyond function calls. Examples include variable states, object identifiers in object-oriented software systems, or assembler instructions. In the following, the proposed technologies preferably are based on the function granularity only.

Figure 2:
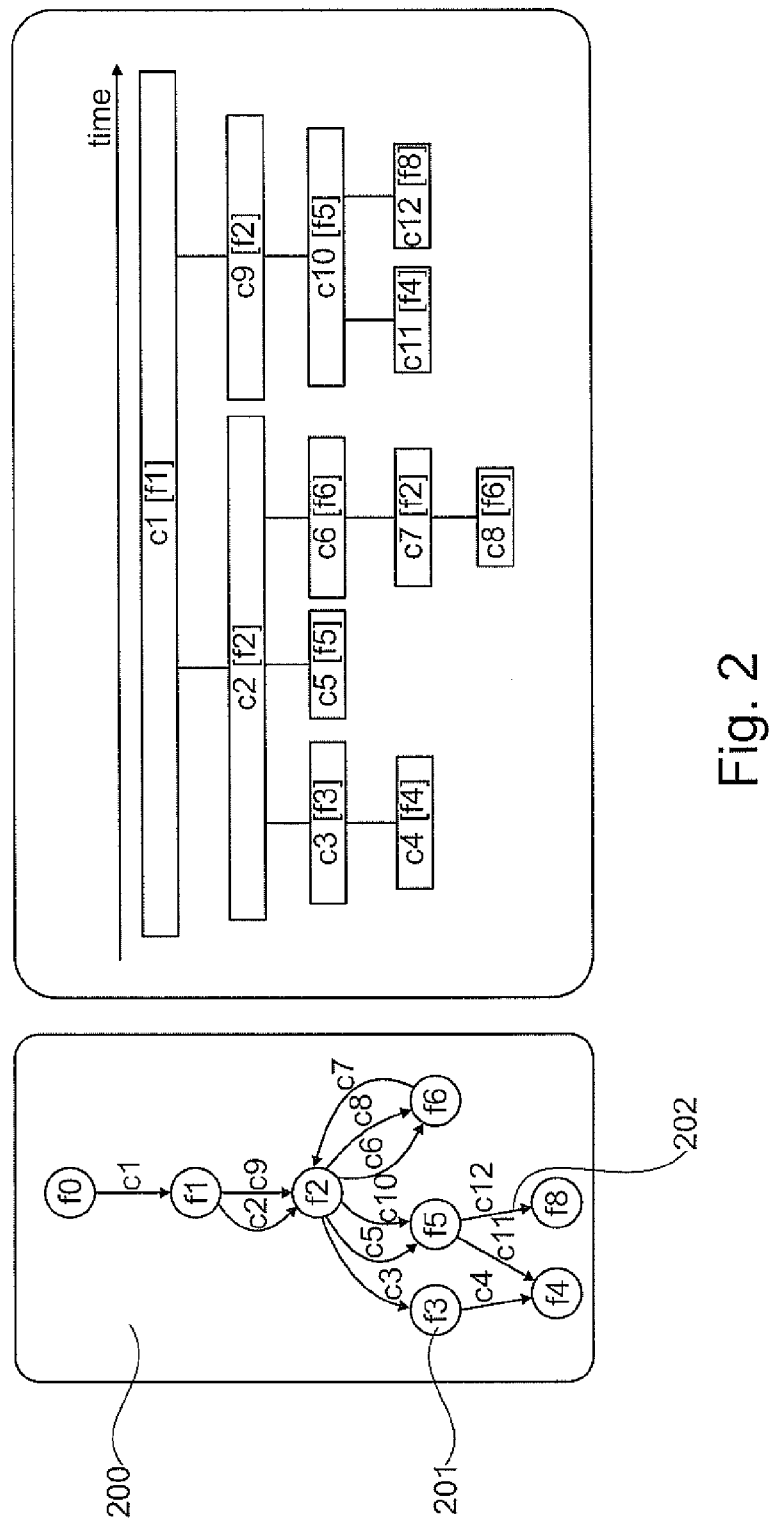

Mathematically, traces can be defined as graphs. Let T be the set of all possible traces, i.e., sequences of function calls that conform to the constraints defined in the following. Each trace $T \in \mathbb{T}$ is defined as a graph $T=(F, C)$ where $F \subset \mathbb{F}$ is a set of nodes representing functions and $C \subset \mathbb{C}=F \times D \times F$ is a set of edges representing calls from a caller function to a callee function (FIG. 2.4). $D=\mathbb{N} \times \mathbb{N} \times L$ are edge labels that carry the information on the start time $ts \in \mathbb{N}$, the end time $te \in \mathbb{N}$ of a call ($ts < te$), and of the location of the call site $l \in L$, e.g., the source code line of the statement that triggers the call. Table 2.1 defines convenience operations for accessing subelements of a call $c=(f, (ts, te, l), g) \in C$.

For each trace $T=(F, C) \in \mathbb{T}$, $C$ forms a tree with regard to time containment (see FIG. 2). This constraint implies a relation between sibling nodes in the call tree that arranges siblings according to their sequential execution times. Additionally, parent-child relations in the tree correspond to caller-callee relations between functions in the graph T. FIG. 2 schematically shows the constraints given. Referring to FIG. 2, a trace is a graph structure 200 of functions (nodes 201) connected via directed edges (calls 202) (left in FIG. 2). The time information attached to the calls 202 ensures that the calls 202 form a tree with respect to time containment (right in FIG. 2). Parent-child relations in the call tree correspond to caller-callee relations between functions in the graph structure 200.

Table 1 shows convenience operations for a given trace $T=(F,C)$ to access subelements of a call $c=(f,(ts, te, l), g) \in C$.

TABLE 1

| Operation | Domain and Range | Result |
| --- | --- | --- |
| time | $\mathbb{C} \to \mathbb{N} \times \mathbb{N}$ | $c \mapsto (t_s, t_e)$ |
| start | $\mathbb{C} \to \mathbb{N}$ | $c \mapsto t_s$ |
| end | $\mathbb{C} \to \mathbb{N}$ | $c \mapsto t_e$ |
| callsite | $\mathbb{C} \to \mathbb{L}$ | $c \mapsto l$ |
| caller | $\mathbb{C} \to \mathbb{F}$ | $c \mapsto f$ |
| callee | $\mathbb{C} \to \mathbb{F}$ | $c \mapsto g$ |

Referring to Table 1, time values are unique. There is exactly one root call, root $\in C$ that encloses all calls in $C \setminus \{root\}$ with regard to time. Any two calls in $C$ are either enclosed in time or do not overlap in time. For any $c \in C \setminus \{root\}$ it holds that: (1) there are one or more calls that enclose the call c in time; (2) for the shortest call $c_{parent}$ of all enclosing calls it holds that callee($c_{parent}$)=caller(c).

Following, a trace visualization process is described in detail.

Figure 3:
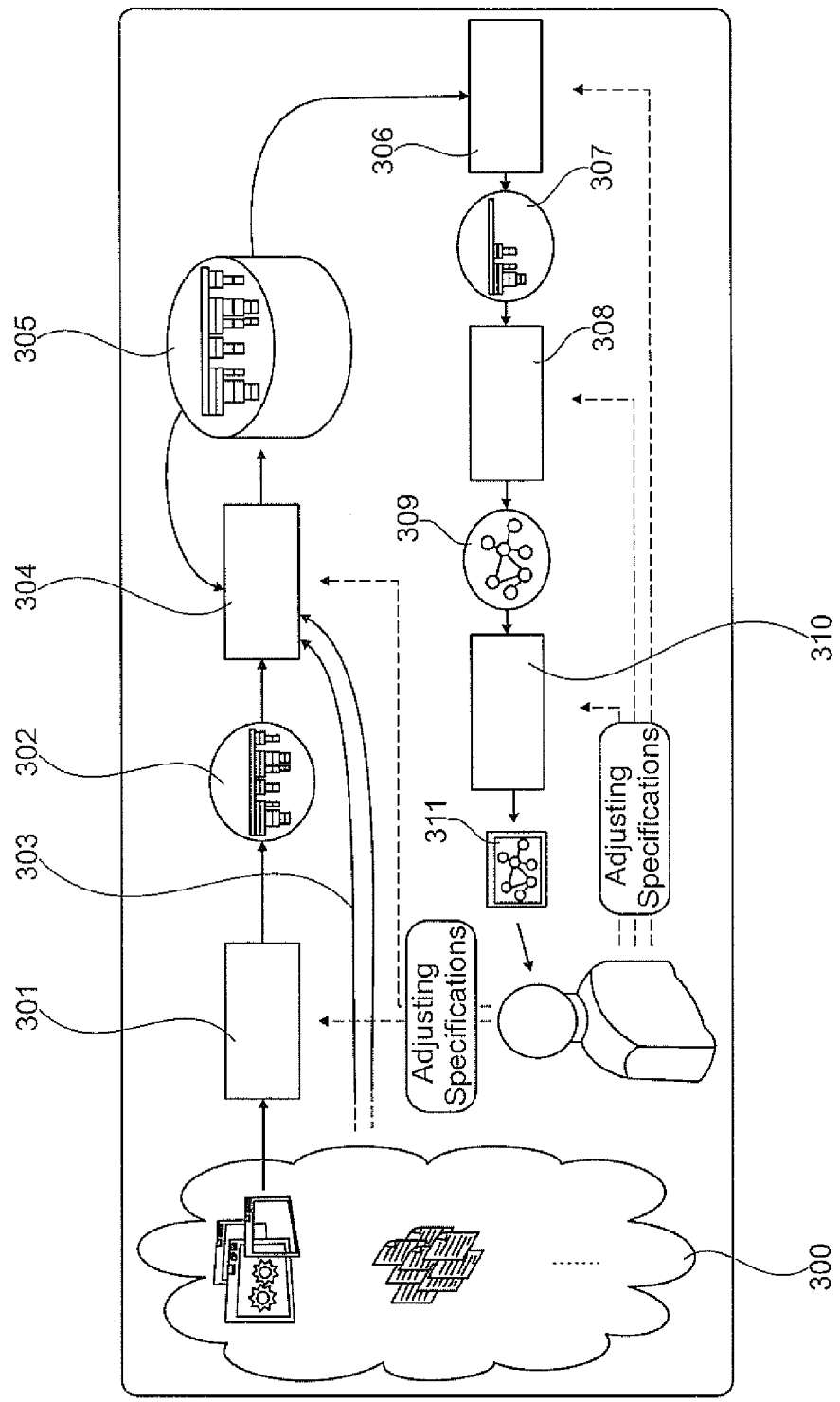

Essentially, the model of the trace visualization process unifies the reverse engineering and the visualization process models; this is schematically illustrated in FIG. 3. The model consists of the following process steps:
  a. Fact Extraction: The starting point is an executable 300 of the software system. In a fact extraction step 301 the executable 300 is modified in such a way that system execution generates a trace (facts) 302. The user, who performs the trace visualization process with the aim of understanding system behavior, needs to execute the software system to capture the trace 302.

Table 2 shows convenience operations on a trace T=(C, F) and a call c∈C or on a set of calls C'⊆C, respectively.

TABLE 2

| Operation | Domain and Range | Result |
|---|---|---|
| parent call | $\mathbb{C} \to \mathbb{C}$ | Returns the shortest call of all calls that enclose c in time. |
| subcalls | $\mathbb{C} \to 2^{\mathbb{C}}$ | Returns the set of calls whose parentcall is c. |
| enclosingcalls | $\mathbb{C} \to 2^{\mathbb{C}}$ | Returns the set of calls obtained from recursively collecting parentcalls starting with c. |
| triggeredcalls | $\mathbb{C} \to 2^{\mathbb{C}}$ | Returns set of calls obtained from recursively collecting subcalls starting with c. |
| costs | $\mathbb{C} \to \mathbb{N}$ | Returns the difference between end and start time of c. |
| selfcosts | $\mathbb{C} \to \mathbb{N}$ | Returns the costs of c minus the costs of c's subcalls. |
| funcset | $2^{\mathbb{C}} \to \mathbb{F}$ | Returns the set of functions that are either caller or callee of a call in the input call set. | b. Fact Analysis: In a fact analysis step 304, the trace 302 is combined with additional facts 303 on the system, e.g., facts describing the static structure of the system. Additionally, further facts are derived, e.g., by way of abstracting or grouping facts. The analysis step 304 stores the results in a fact base 305.

c. Filtering: In a filtering step 306, a subset 307 of the facts is taken from the fact base 305 according to a developer-defined query. Defining the filtering this way differs from any definition evolved in the context of visualization. According to this definition, data preparation aspects are not included in the visualization related definition of filtering but are located in the fact analysis step 304.

d. Mapping: In a mapping step 308 the fact subset 307 is transformed into a geometry model 309. In the geometry model 309 the facts are represented by geometric primitives and their associated attribute values such as form, size, orientation, position, color, brightness, and texture.

e. Rendering: In a rendering step 310 the geometry model 309 is rendered; resulting images 311 are presented to the user.

The three steps of filtering 306, mapping 308, and rendering 310 are combined within the term fact presentation. Fact presentations define views on the fact base 305. The trace visualization process is an interactive process. In other words, the developers or users interactively adapt the views to facilitate the building of mental models on the system's structure and behavior.

Following, it is referred to the process of extending traces with module hierarchy information.

Functions as smallest named implementation units are grouped into more coarse-grained implementation units, forming a hierarchical structure—the module hierarchy of the software system. The term module as used here is defined as follows: A module is an implementation unit of software that provides a coherent unit of functionality. It is a hierarchical element, i.e., an element that can consist of like-kind elements. A module can consist of submodules that are themselves modules.

The module hierarchy of a software system can be represented as tree $M=(V,H)\in\mathbb{M}$ where $V\subset\mathbb{V}$ is a set of nodes representing modules and $H\subset\mathbb{H}=V\times V$ is a set of tree edges representing the hierarchical containment relation between modules. Table 3 defines operations on a module hierarchy $M=(V,H)$ that simplify the description of algorithms.

TABLE 3

| Operation | Domain and Range | Result |
|---|---|---|
| parent | $\mathbb{V} \to \mathbb{V}$ | Returns the module that contains v. |
| ancestors | $\mathbb{V} \to 2^{\mathbb{V}}$ | Returns the set of modules obtained from recursively collecting parents starting with v. |
| descendants | $\mathbb{V} \to 2^{\mathbb{V}}$ | Returns the set of modules that have v as an ancestor. |

In the following, it is referred to module names and function semantics. When traces are explored, the functions responsibilities for the exhibited system behavior need to be understood. The comprehension process is accompanied by interpreting function names and function call relations. Further semantics conveying information on functions can be obtained from taking the module hierarchy into account. Developers may derive additional information on a function's semantics from the names of the modules of which the function forms a part. The purpose of a function called call0nStartRequest ( ), for example, can be assessed more easily, if the developer is aware of the fact that the function is contained in the module hierarchy of Channel, Http, Protocol, and Network. To facilitate the exploration of traces, module names can be evaluated (Bohnet et al., Visual exploration of function call graphs for feature location in complex software systems, Proceedings of the ACM Symposium on Software Visualization, ACM, 2006, pp. 95-104).

There are maintenance tasks facilitated by trace visualization.

A large set of maintenance tasks are related to system features. A feature is a system behavior that can be triggered by the user of the system and produces some kind of output that is visible to the user. Many feature-related maintenance tasks can be supported by trace visualization. Moreover, the fact that the user knows when the feature starts and when it ends is a real advantage here.

Such tasks include:

Feature Location—Requests for modifying and extending existing software systems are in most cases submitted and expressed by end-users in terms of features. In order to meet such a feature change request, developers need to translate it into terms of source code. First, they have to locate the source code components responsible for feature functionality. Second, they need to understand how these components interact. In the case of complex software systems, this is a cost intensive and time consuming task. Trace visualization can prove useful to developers performing this task because it reduces the vast amount of source code enabling developers to inspect the executed parts and as it provides higher-level views on the executed code.

Fault Localization—If a failure occurs while executing a software system, i.e., if the system fails to do what it should do, it is often time consuming to locate the failure causing fault (bug, defect) within the code. In complex software systems the executed functionality is usually scattered throughout the system implementation. Subtle and often undocumented couplings exist between different parts of the implementation.

Furthermore, code corresponding to functionality that exhibits the failing behavior is frequently not the source of faulty system behavior. Hence, a developer first needs to identify the code that corresponds to the functionality that is exhibiting the failing behavior. Having identified the starting point, the developer needs to go back in time and analyze the control flow until the fault, i.e., the origin of the failure, is found. With trace visualization, however, developers record the control flow before and while the system exhibits the failure. Later, they are able to analyze the system behavior back and forth in time as if they had a time machine. For instance, it can be analyzed what happened before a crash occurred.

Scalable Tracing Technology

Tracing visualization techniques denote techniques for extracting function call sequences from a running software system. The applied tracing technique represents a crucial bottleneck in the trace visualization process. Major difficulties when tracing techniques include: i) It is difficult to "weave" the technique into existing build processes. ii) The amount of data collected during tracing is generally huge. iii) The runtime overhead of the tracing technique can be disturbing.

Following, a scalable and robust technique for software systems, preferably for C/C++ software systems, is described that is easily integrated into complex build processes and applies to a wide range of platforms. There are general advantageous aspects. Firstly, common instrumentation facilities provided by most compilers and common runtime code-modification facilities provided by most debuggers are exploited. By relying on common compiler and debugger facilities, a high degree of applicability, easy integration into existing build processes, and a measure of robustness is attained. In addition, a technique is provided that analyzes how frequent functions are executed during tracing and which selectively disables—at runtime—functions from being traced whose call frequency exceeds a developer defined threshold. Automatically eliminating functions called with high frequency reduces the size of the resulting trace and the runtime overhead of the tracing technique.

Tracing Techniques as Part of Scalable Trace Visualization

A tracing technique that provides a basis for a scalable trace visualization tool needs to fulfill a variety of requirements related to integration into both existing build and maintenance processes, to tracing granularity, to applicability on different platforms, and to ways of being extended to or combined with techniques for gathering system state information.

There needs to be integration into build processes.

Figure 4:
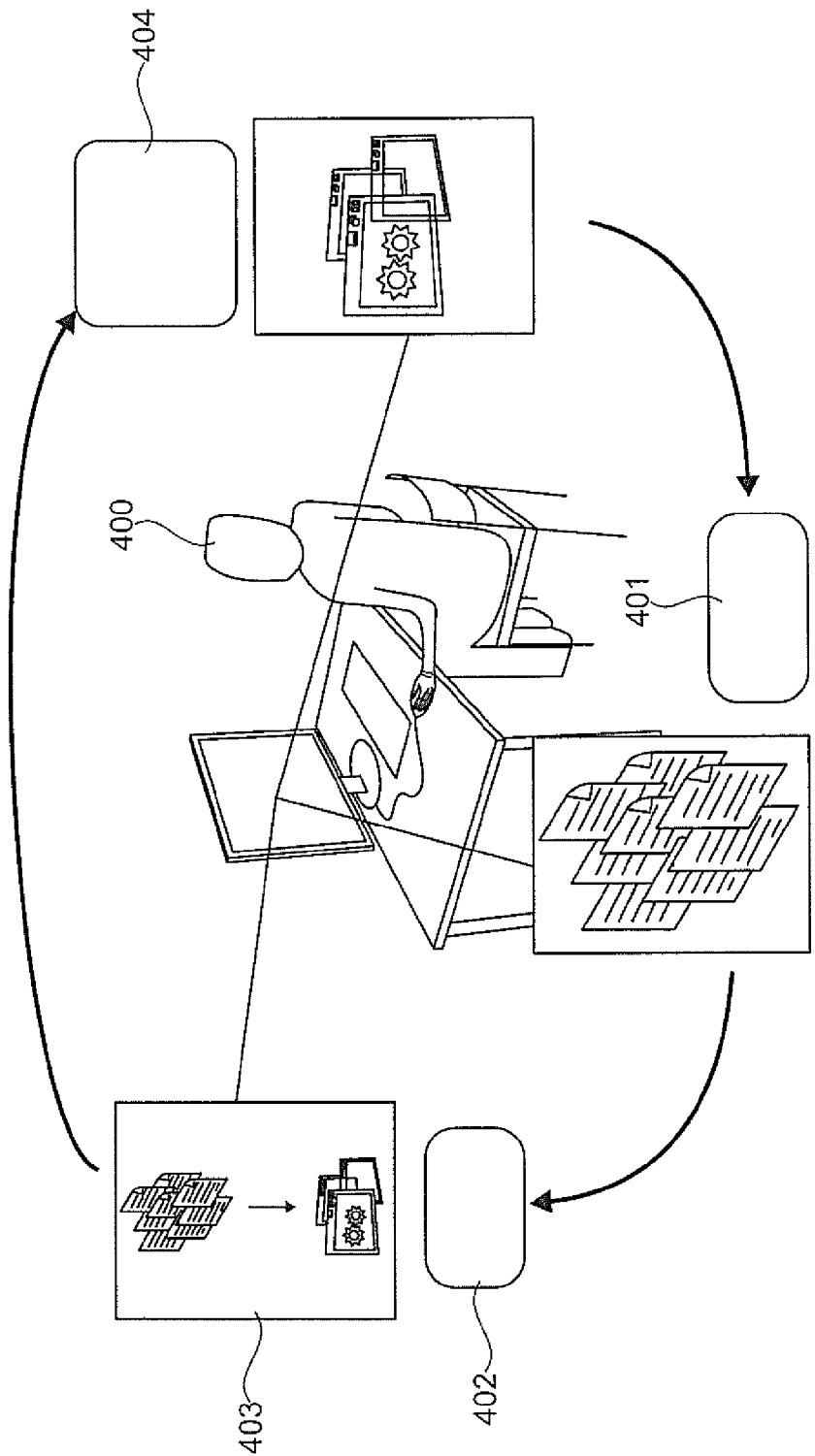

FIG. 4 shows a schematic representation of an edit-build-run cycle. A developer or user 400 modifies source code of a software system implemented on a computer system in an editing step 401. Following, in a building step 402 executables 403 of the source code modified are built. In a running step 404, the user 400 checks whether the modified executables 403 behaves as expected.

Further, there is need for integration into existing maintenance processes.

Performing a maintenance task generally means running through the edit-build-run cycle, i.e., modifying source code, building executable code, running the system, and observing its behavior (see FIG. 4). Integrating trace visualization into the edit-build-run cycle must not slow down the overall performance of the developer when performing the cycle. Hence, important requirements for the tracing technique include:

The runtime overhead with disabled tracing should be minimal. "Disabled" means that all preparations, e.g., compile-time instrumentation, have already been applied, however, no information is captured. A noticeable general decrease in system performance is likely to be perceived as disturbing by developers and will not appeal to them.

The tracing technique should be compatible with the state-of-the-art tools for understanding behavior: debuggers. Hence, it should be possible to seamlessly start and stop tracing from within a debugging session: Using a standard debugger, developers go step by step through execution. At each call statement they decide whether to follow the function call or to step over it. It is often difficult to choose between the two actions. On the one hand, following each call is highly time consuming, and on the other hand, a developer who steps over a call runs the risk of skipping parts of the execution that are relevant to the given maintenance task. With a tracing technique that can be started within a debugging session one can implement a "trace over" functionality that traces indirectly triggered function calls while stepping over a single call.

Seen from the trace visualization perspective, using a debugger to first navigate to the interesting parts of the execution before activating tracing, is an effective way of coping with the scalability problem of trace visualization: Traces only capture the behavior that is triggered by a single call. Hence, traces are by several orders of magnitude smaller than if tracing is started and stopped on the "freely" running system.

Enabling and disabling the tracing technique must be fast. Developers are not likely to apply trace visualization, if they have to wait for several minutes or even a complete rebuild of the system before they can take advantage of visualization. If tracing is to be applicable from within a debugging session, then the tracing technique must represent a technique that performs execution-time binary code instrumentation.

Also, there is need for adjustable tracing granularity.

To reduce the often large size of a trace right from the start, developers need to be able to adjust the granularity level of trace data according to the given maintenance task. This means, they should be able to choose between tracing only selected functions (low runtime overhead and less detail) and tracing most functions (higher overhead, but more detail). If developers are in possession of a-priori knowledge of specific functions or whole modules that are not relevant to the given maintenance task, the respective functions should be excluded from the tracing technique. Additionally, there should be an automated technique that identities functions called with high frequency during tracing and excludes them automatically.

Still, there is need for a high degree of applicability and robustness.

Given the trace visualization process, applying the tracing technique is the only step that is conceptually platform and processor dependent. The tracing technique, therefore, limits the range of applicability of a trace visualization tool. Hence, it is advantageous to use concepts for the tracing technique that are implementable on a wide range of platforms. Furthermore, one advantage should be taken of already available common instrumentation techniques with a view to achieving a high degree of robustness.

Finally, there is compatibility with state tracing techniques.

So far, the scope was limited to understanding system behavior by means of analyzing control flow, which is considered to be the fundamental comprehension task. However, understanding system behavior goes further. Mental models of system state and state changes are built on top of a mental model of control flow. Hence, an additional requirement on the tracing technique arises, if one gets beyond the scope of control flow: The technique should either be able to allow the gathering of state information or it should prove operational in combination with another technique that focuses on gathering state information.

It would be interesting, for instance, to be able to trace function calls while the system is under the control of a scriptable debugger that logs accesses of task relevant variables, or, more precisely, the respective memory locations. The combined captured data would give developers a good overview as to when and how the values are read and written. In a debugging scenario, for instance, this helps a developer to understand the contexts in which erroneous values are written.

Robust Execution-Time Instrumentation by Reverting Compile-Time Instrumentation

Starting and stopping the tracing technique from within a debugging session has the advantage of creating smaller and more precise traces and achieves better integration in the edit-build-run cycle. However, this requires execution-time instrumentation. Existing techniques use code splicing for this, which means, new memory is allocated for additional code and original code is partly relocated. The implementation of code splicing depends on the platform. Implementing it in a robust way is a challenging task.

The tracing technique proposed here, in a preferred embodiment, is based on a hybrid instrumentation approach, i.e., it exploits the robustness of compile-time instrumentation provided by most compilers and the ease of replacing binary code at execution-time by using a standard debugger. Trace visualization becomes part of the run step of the edit-build-run cycle:

Edit: The developer modifies source code as usual.

Build: The build step is slightly modified by means of adding global compiler and linker options, and a post-build step. These modifications have the following effects: Compiler-supported function entry-point instrumentation is performed, and compiler-supported instrumentation is reverted afterwards.

Run: The developer runs the system as usual to check its externally visible behavior.

If unexpected behavior is experienced, the developer tries to link the behavior with the code—generally done by means of using a debugger. This is where trace visualization comes in: Functions are activated for tracing by using standard debugger facilities; the system runs until a developer-defined execution point is reached; and after recording a trace, the developer explores what happened during runtime by analyzing the visualized trace.

Compiler-Supported Function Entry-Point Instrumentation

Figure 5:
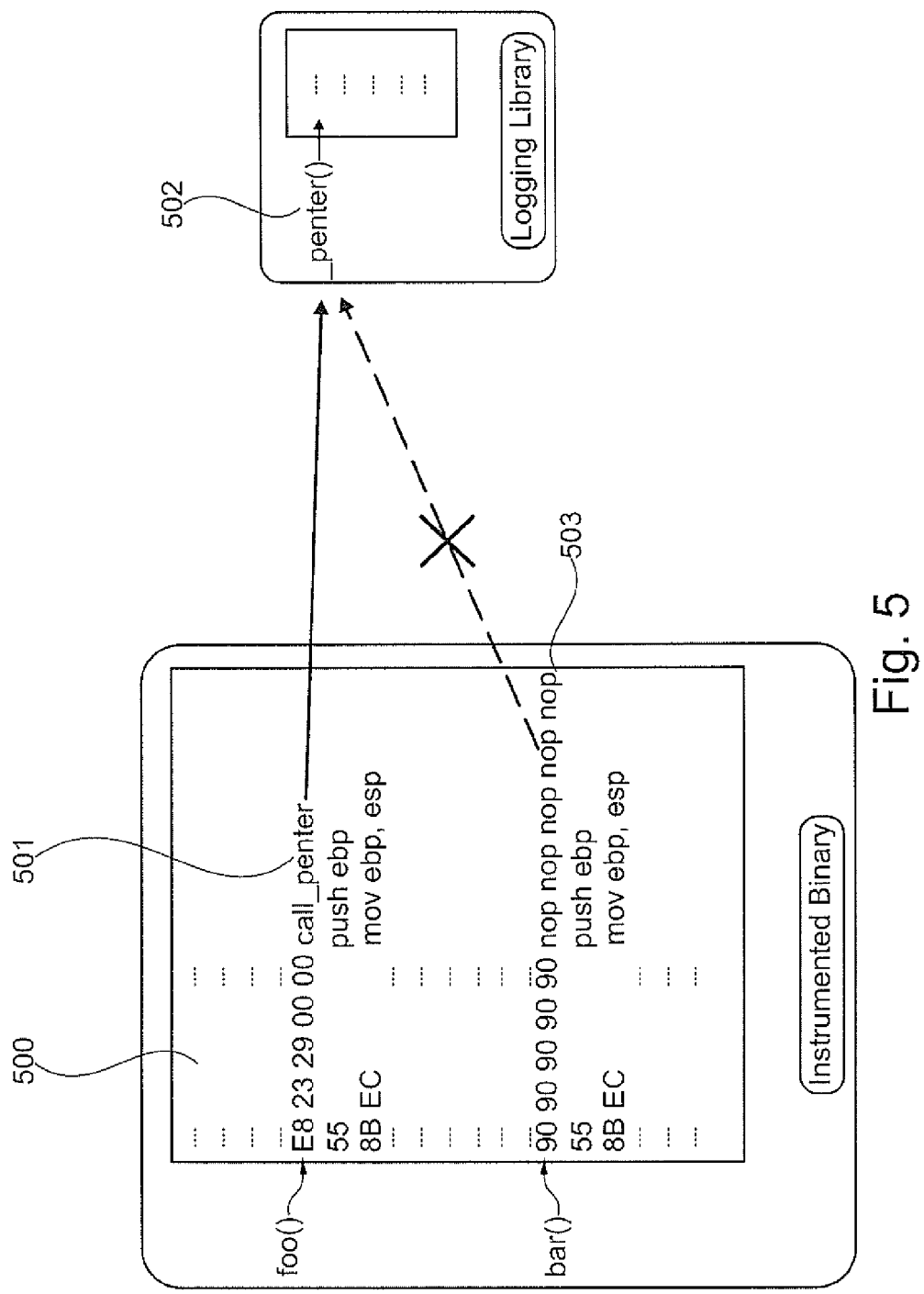

FIG. 5 shows a schematic representation of a process of inserting a call function in a binary code and replacing the call function by a NOP instruction.

With function entry-point instrumentation, in a binary code 500 the compiler inserts a call instruction 501 at the beginning of each function to redirect control to a hook function 502. Replacing the call function 501 by a neutral instruction 503 also referred to as NOP instruction deactivates control redirection.

A wide range of compilers provide options for instrumenting the entry-point of functions. With this, the call function 501, preferably an assembler call instruction is placed at the beginning of the binary code of each function. The inserted call function 501 redirects control to the hook function 502. For building a tracing tool, the hook function's implementation needs to be provided. The Microsoft Visual Studio Compilers (from version 6.0 to version 2010), for instance, provide the Gh compiler option for inserting hook function calls; the GNU Compiler Collection GCC provides the option of instrument-functions. Many compilers also provide options for instrumenting function exit-points. In a preferred embodiment, the proposed tracing technique only uses function entry-point instrumentation, however. Instead of exit-point instrumentation, return address rewriting as described by Brown (Building a Lightweight COM Interception Framework Part 1: The Universal Delegator. In: Microsoft Systems Journal 14 (1999), January, No. 1 http://www.microsoft.com/msj/0199/intercept/intercept.aspx) is applied. Limiting the technique to function entry-point instrumentation increases its applicability because not many compilers provide support for exit-point instrumentation—the Microsoft Visual Studio 6.0 Compiler is an example.

Building a tracing technique based on common compiler features has several advantages:

Instrumenting function entry-points does not increase compile time significantly because it is part of the usual compilation process anyway.

For the same reason, the instrumentation is robust and does not interfere with code optimizations.

It is easily integrated into existing build processes. Only global compiler and linker options need to be set, which can generally be done without any knowledge of the internals of the build process.

After building the fully instrumented binary code, all additionally inserted call instructions or functions are removed and are replaced with assembler NOP instructions. The replacement reverts the effects of compiler-based function instrumentation. The resulting binary File does not create any tracing events at runtime and behaves as usual. Only a slight performance decrease (<2%) is noticeable due to the additional NOP instructions.

The address locations of the instructions to be replaced can be obtained via the binary's debug information, which provide the entry-points of all functions contained in the binary. During replacement, the call instructions are stored in a database, where they remain until needed to restore the calls later when reactivating the tracing.

Tracing by Execution-Time Instrumentation

During the period when the developer runs the software system—either "freely" or by means of stepping through its execution with a debugger—tracing may be activated at any time. Throughout this phase, the software system's process is brought under control of a debugger (if it has not already been brought under control) and all the threads are suspended. Then, for all those functions of interest, standard memory rewriting facilities of the debugger are used to put the original assembler call instructions from compile-time instrumentation in place again. During instruction replacement, one needs to check that none of the process' threads points with its instruction pointer to an NOP that is about to be replaced. If this is the case, the respective thread is stepped forward with the debugger until the instruction pointer has left the NOPs.

Unsuspending the threads causes the system to continue executing. Now, call entries and exits of the activated functions are captured during execution. Tracing may be stopped at any time—either by breaking into the software system's process with the debugger or by setting a breakpoint at a code location by indicating where tracing should be stopped if the process runs under debugger control. When execution is halted, the debugger is used to put NOPs in place again to deactivate tracing.

Next, the captured trace is visualized. The developer explores which functions were executed and how they interacted. With this knowledge of task relevant code locations, it is either continued with the edit-build-run cycle and the code is modified; alternatively, well-placed breakpoints are set and the debugger is used to get a fine-grained understanding of system behavior.

Automatically Detecting and Excluding (Utility) Functions During Tracing

Traces are typically large and frequently consist of hundreds of thousands of calls—even where the functions are restricted to be traced by excluding modules. Analysis on how each function in the trace contributes to the size of the trace have confirmed that as a rule only a small number of functions are responsible for a large fraction of the calls. The reason for this unequal call distribution is that traces reflect the execution of nested control loop structures in the code. In the inner loops, fast low-level functions are repeatedly called, which causes the trace to grow rapidly. For the purpose of describing preferred embodiments, the term utility function is used for these functions. A utility function is a function whose call frequency in a time window of a developer—defined length exceeds a developer—defined threshold.

Utility functions typically implement low-level functionality in the software system. For example, a trace capturing the execution of a resizing feature of an image processing application are likely to contain massively called functions performing low-level operations on color values. In most cases, massively called functions can be ignored in captured trace data. The definition as to which functions are classified as massively called functions depends on a threshold value set by the developer according to the given maintenance task.

There is, however, one limitation with this approach. It is assumed that a function that at one stage ascertained to be a massively called function implements only the functionality that this classification is based on. This assumption loses its validity in connection with weak modularized functions that implement, for example in a large switch case, a set of different functionalities, some of them representing lower-level and some higher-level system functionality. The technique would probably exclude the function from the trace by mistake. However, although the execution of erroneously classified massively called functions is not contained in the trace, the sub-calls that are triggered by the "invisible" call are still contained in the trace.

In order to measure the call frequency of functions during tracing-time and to compare the frequency value v against a threshold vmax, functions with frequencies v≥vmax are classified as massively called functions and are not traced further in the execution. With this technique, the size of a trace is automatically reduced by several orders of magnitude without the availability of any pre-existing knowledge of the system's implementation and without losing information on higher-level system behavior. Information on high-level system behavior is conserved, because only those functions are excluded that are executed in the inner most control loops.

For an example of this consider the transform functionality of a 3D content management system. FIG. 6 shows a simple implementation of the transform functionality: The "high-level" function transform3DScene( ) delegates work to the "mid-level" function transformSceneObj( ), which in turn calls a "lowerlevel" function transformVertex( ). Within this function, the "lowest-level" function Vertex::setPos( ) is used to update a vertex' newly calculated position.

FIG. 6 shows a code example to illustrate identification of massively called functions. In a trace that captures the execution of transform3DScene( ) the functions mentioned in the example are called with different frequencies. Table 4 discusses the call frequencies and the call counts—given that the Scene object contains 350 SceneObj objects each being built of 5000 Vertex objects in average. Setting vmax to a value between the "mid" and the "high" frequency classification, for instance, removes all calls to Vertex::setPos( ), Vertex::getVector( ), and transformVertex( ). This reduces the number of calls in the trace from 8.750.702 to 702 and retains the information as to how the "high-level" function transform3DScene( ) applies the transformation to each of the objects contained in the scene.

TABLE 4

| Call Frequency v | Call Count | Function |
| --- | --- | --- |
| low | 1 | transform3DScene( ) |
| low | 1 | Scene::getObjects( ) |
| mid | 350 | transformSceneObj( ) |
| mid | 350 | SceneObj::getVertices( ) |
| high | 1.750.000 | transformVertex( ) |
| high | 1.750.000 | Vertex::getVector( ) |
| very high | 5.250.000 | Vertex::setPos( ) |

A complete code example would in addition contain functions, such as the trigonometric functions sin( ) and cos( ). These functions would be called at least as frequently as transform Vertex( ) and would, therefore, also be classified as being massively called functions.

As the threshold vmax can be chosen by the user, a tracing granularity level may be chosen that is suitable for the given maintenance task. On the one hand, a very low threshold value may be chosen, if the user needs to analyze system behavior on a coarse-grained level over a long execution time—for instance if a feature location task is performed. On the other hand, a very high threshold value may be chosen for capturing many details in the trace—for instance, if a debugging task is being performed.

A positive effect of the automated deactivation of massively called functions is—besides the reduced size of the trace—that the runtime overhead introduced by the tracing technique is also reduced. Capturing function calls means executing additional binary code for event registration and serialization. Even if this code is highly optimized with regard to performance, tracing still leads to a noticeable performance decrease. Due to the unequal distribution of calls of massively called functions, the lion's share of tracing overhead is a consequence of executing these functions. Hence, if tracing is deactivated for these functions, the absolute performance overhead is drastically reduced, making it possible to apply the tracing technique even on a deployed system running in a production environment.

The method proposed especially applies to large industrially developed software systems. To give an impression of which functions are found as being massively called in a realworld scenario, Table 5 lists results from applying the method to the Blender (www.blender.org version: Blender Foundation) software system comprising 460.000 lines of C code. With a threshold value vmax=100, for instance, low-level functions are excluded from tracing. Higher-level functions such as GUI menu entry points are still contained in the trace, however. The frequency value is given with regard to a time window of 100 million processor ticks. (Functions with the same names are overloaded versions.)

As can be seen, functions with high call frequencies are functions implementing lowest-level functionality. On the contrary, functions such as those contained in the GUI layer representing entry points for Blender's features have low call frequencies.

TABLE 5

| Call Frequency v | Function |
|---|---|
| 3936 | add_v3_v3( ) |
| 3330 | _CTX_data_equals( ) |
| 2012 | _EM_remove_selection( ) |
| 2012 | _CustomData_from_em_block( ) |
| 1968 | add_v3_v3( ) |
| 1583 | _cent_quad_v3( ) |
| 1564 | edge_normal_compare( ) |
| 1512 | _findedgelist( ) |
| 1512 | _addedgelist( ) |
| 1383 | normalize_v3( ) |
| 1383 | normalize_v3_v3( ) |
| 1383 | mul_v3_v3fl( ) |
| 1383 | dot_v3v3( ) |
| 1303 | _normal_quad_v3( ) |
| 1114 | calloc_em( ) |
| 1014 | normalize_v3( ) |
| 1014 | normalize_v3_v3( ) |
| 1014 | mul_v3_v3fl( ) |
| 1014 | dot_v3v3( ) |
| 1007 | _CustomData_em_free_block( ) |
| 1005 | _free_editedge() |
| ... | ... |
| ... | ... |
| ... | ... |
| 4 | _ui_handle_menu_event( ) |
| 4 | ui_handler_region_menu( ) |
| 4 | ui_item_local_sublayout( ) |
| 4 | ui_mouse_motion_towards_check( ) |
| 4 | _unit_m4( ) |
| 4 | ui_mouse_motion_towards_init( ) |
| 4 | len_v2v2( ) |
| 4 | ui_but_find_mouse_over( ) |
| 4 | ui_handle_button_even( ) |

Event Buffer Management

With the intention of clarifying to which data structures the algorithm for identifying massively called functions is applied, the following briefly explains how event registration and serialization concepts are implemented. Function entry and exit events are registered by redirecting control to a hook function.

Figure 7:
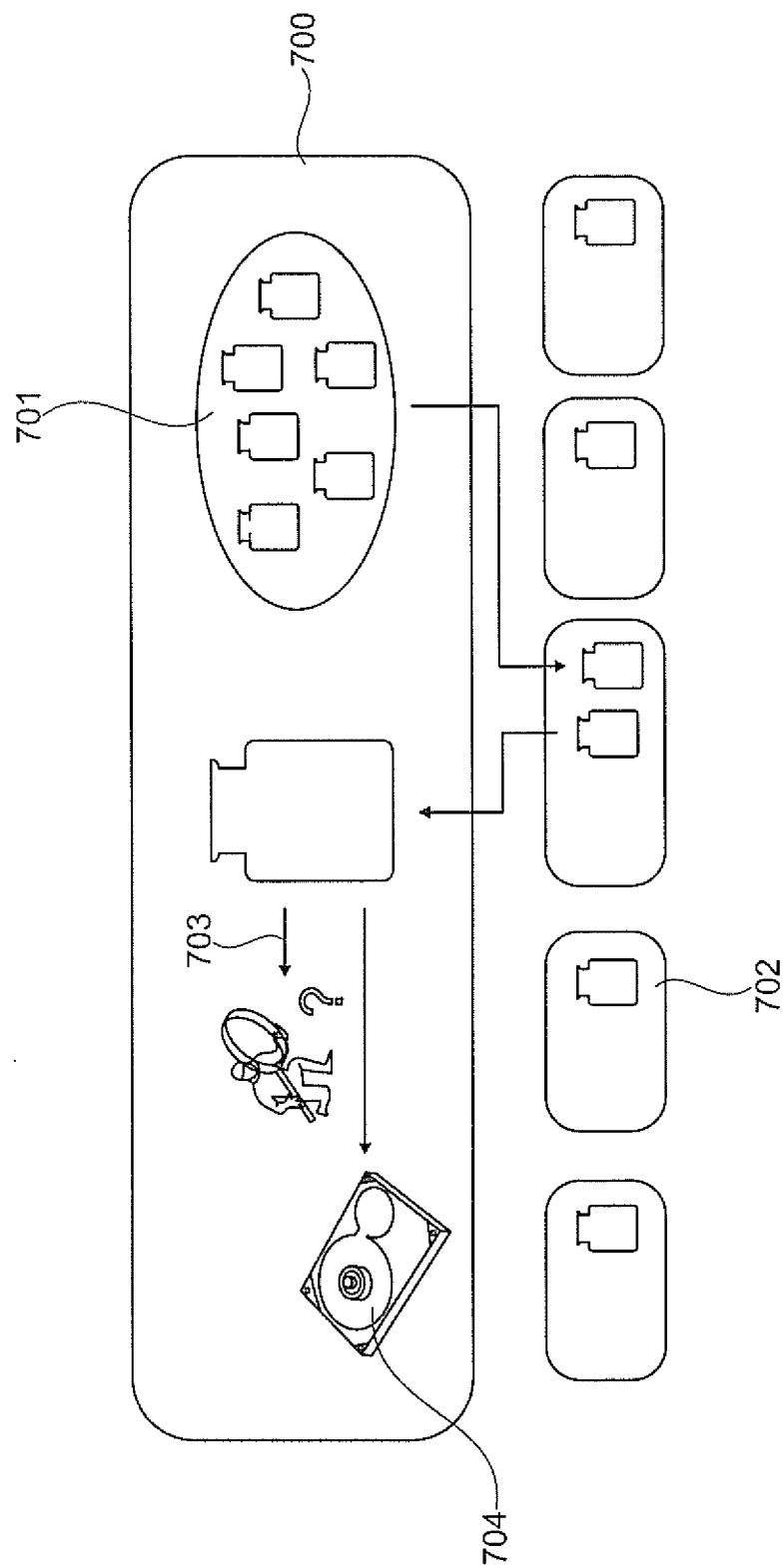

FIG. 7 shows a library for registering and serializing function entry/exit events. An additional coordinator thread handles buffers of function entry/exit events. Filled buffers are analyzed for massively called functions and serialized to hard disk.

The hook function is part of a logging library that works as follows (see FIG. 7):
- When the library is loaded at runtime, it spawns an additional thread: a coordinator thread 700.
- The coordinator thread 700 creates and manages a pool of empty event buffers 701.
- Each one of system process' threads 702 (except for the coordinator thread) has a dedicated event buffer where function entry and exit events are stored when the thread's control is redirected into the logging library.
- If an event buffer is full, the respective thread takes an empty buffer from the pool. The coordinator thread 700 is responsible for a step of serializing 703 the events in the filled buffer to a hard disk 704.

An event buffer sequentially stores events, each containing (at least) the following information: A flag indicating if it is a function entry or exit event; the start address of the respective function in memory space; and a time stamp. The events are stored in chronological order in the buffer.

Detecting Utility Functions

For detecting and deactivating utility functions at runtime, especially massively called functions, each event buffer is analyzed 705 before its events are serialized to the hard disk 704. The algorithm for detecting massively called functions in the buffer is parameterized by a frequency threshold value vmax and a time window $\Delta t$. It operates on a given buffer as follows:

a) Let $t_{cur}$ be the time stamp of the first event in the buffer. Let i be the iterator pointing to first event in the buffer. Let $i_{end}$ be the iterator pointing to the last event in the buffer. Let AddrCount Map be a map of function addresses and counters $2 \epsilon N$.
Let AddrSet be an initially empty set of function addresses.
b) While i is not equal $i_{end}$ do:
1. Clear AddrCountMap.
2. Increment i until an event is found with a time stamp $t > t_{cur} + \Delta t$ or until the last event in the buffer is reached. While incrementing i do:
If the event that i points to is an exit event do:
Register the event's function address in AddrCountMap with count 0, if the address has not been registered yet.
Increment the respective count value by 1.
3. $t_{cur}$=time stamp of the event that i points to.
4. For each function address addr in AddrCountMap do:
If addr's respective count value v>vmax do:
Insert addr into AddrSet.

The algorithm having been applied, AddrSet contains the addresses of the functions that are classified as being massively called functions.

Deactivating Utility Functions at Runtime

To deactivate tracing for utility functions, the functions' assembler call instructions that redirect control to the hook function needs to be removed (see FIG. 5). The elements in AddrSet contain precisely those addresses in memory space where the call instruction is located. Hence, one only needs to overwrite the call instruction with NOP instructions.

One possibility of performing the binary code modification is by suspending all threads from within the coordinator thread 700 (see FIG. 7), putting the NOPs in place and unsuspending the threads again. Suspending the threads is necessary, as replacing the call instructions with multiple NOPs is not an atomic operation. Hence, a thread might run into a situation where only some of the NOPs are set, causing the application to crash. Another way of performing the binary code modification is to execute an int3 instruction and allow an attached debugger to handle this trap. The debugger then performs the code modification "from outside".

Due to the construction of the algorithm for detecting massively called functions, not all massively called functions can be identified immediately. Rather some can be identified after analyzing several buffers that contain their events. Hence, a post processing operation is applied to the resulting trace that removes the events of all massively called functions.

Measurements

The trace visualization method described above is implemented within a software framework called CGA. CGA is an abbreviation for call graph analyzer. Analyzing call graphs is what CGA was first implemented for. This name is now outdated because the functionality of the CGA framework meanwhile comprises a greater degree of functionality than only analyzing call graphs. For reasons of consistency with literature, the name is still used. CGA comprises the following functionalities:

Extracting dynamic, static, and evolution facts from implementations.
Integrating the facts in a combined data model and storing them in a common database.
Providing a variety of generic trace visualization views.

Providing several maintenance-specific views on dynamic, static, and evolution facts.

Composing views as trace visualization tools.

CGA is implemented in C++. It is logically decomposed into two parts: Extraction and Analysis. Runtime components built from the two modules communicate by means of the shared data exchange format for extracted facts and by using a common network communication protocol.

To evaluate the proposed trace visualization concept, CGA is applied to realworld software systems. Performance measurements show that the concept—even in its prototypically implemented form—applies to complex software systems and comes to terms with scalability issues that trace visualization frequently encounters. The measurements were performed on a Lenovo Thinkpad X200 Tablet notebook with an Intel Core 2 Duo CPU L9400@1.86 GHz.

In a preferred embodiment, the proposed tracing technique initially applies compiler-based instrumentation and then neutralizes it by replacing the instrumentation code with NOP assembler instructions. This approach enables developers to activate tracing at runtime with standard debugger facilities in a highly robust way.

However due to the NOP instructions, the resulting binary code differs from the one built without instrumentation. One important requirement of any trace visualization tool is that it should not hinder the developers from performing their usual development processes. As the tracing technique is integrated into the usual build process, the runtime overhead of the tracing technique needs to be negligible during the usual development process, i.e., if tracing is disabled.

To measure the effect of additional NOP instructions, the instrumentation technique was applied on the 130kLOC C/C++ software system brec of virtualcitySYSTEMS GmbH. One feature of the system is to reconstruct 3D building models from point clouds that were obtained by laser scanning (LiDAR). The instrumentation technique was applied onto the release build configuration of brec. In the release build, several functions are inlined or optimized by the compiler which reduces the amount of functions in the binary code, i.e., binary code units that are entered via an assembler call instruction. However, 8350 functions are still contained in the binary code and are therefore traceable.

The system functionality being chosen for the measurements is the 3D reconstruction of the first building of a small test data set. Without instrumentation, the execution takes on average 20 seconds. In the experiment, for multiple runs the amount of processor ticks consumed during the reconstruction is measured. Ticks are measured using the RDTSC processor instruction. Without instrumentation, an average of 36.761.000.000 ticks is measured. With instrumentation, i.e., with additional NOP instructions, an average of 37.407.000.000 ticks was obtained.

Figure 8:
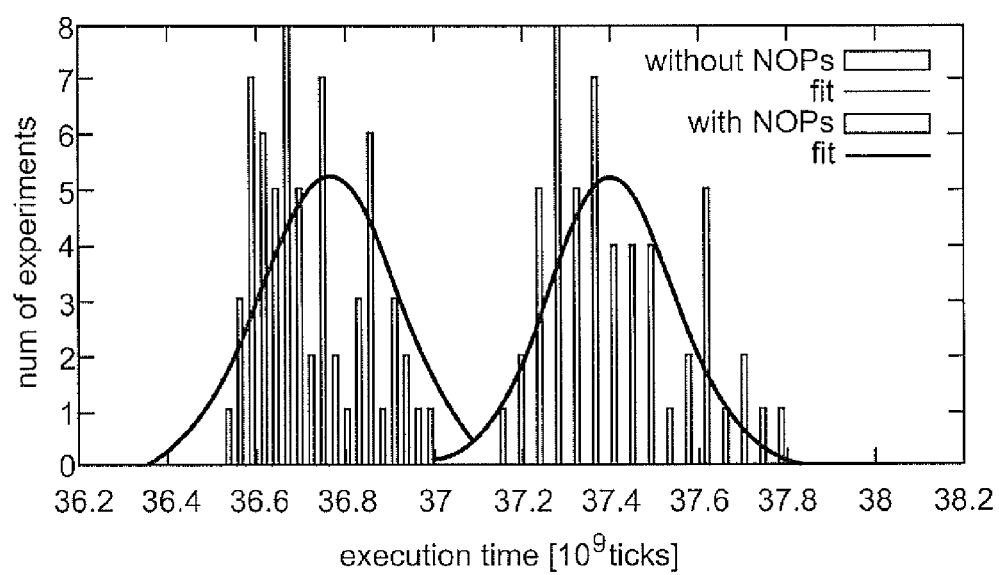

FIG. 8 shows a histogram of the measurements performed. The experiments were performed multiple times with the building reconstruction feature of the brec software system of virtualcitySYSTEMS GmbH. As illustration of the average ticks values, the histogram deviations are fitted with Gaussian curves. In this specific execution scenario, the performance overhead due to the NOP instructions was approximately 1.7%.

To calculate the performance overhead per function call, next the amount of calls that are executed during building reconstruction was measured. Therefore, all functions are activated for tracing. That is, the NOPs are replaced by the call instructions that were originally inserted by compiler-based instrumentation. The event collecting library counts 26.196.226.749 calls. Hence, the performance overhead per call due to the NOP instructions can be estimated as $$\frac{37.407.000.000 - 36.761.000.000}{26.196.226.749} \frac{\text{tick}}{\text{call}} = 0.02 \frac{\text{tick}}{\text{call}}.$$

To determine the runtime overhead that is introduced by the event collecting mechanism, the time (in ticks) for capturing the call entry and exit events by the total number of events was divided. Recording the trace of 26.196.226.749 calls took 46.496.000.000.000 ticks, which corresponds to approximately 7 hours. To solve the problem that serializing the trace would require an extraordinarily large amount of disk space, events of each event buffer were written only temporarily onto hard disk and the used space was freed up again afterwards. Provided that 20 Bytes for each event were needed, it would need 1000 Terra(!) bytes of disk space for the ≈53 billion events if being stored in a raw format. The event registration overhead per event is $$\frac{46.496.000.000.000}{2*26.196.226.749} \frac{\text{tick}}{\text{event}} \approx 890 \frac{\text{tick}}{\text{event}}.$$

As shown below, by applying the technique for deactivating massively called functions, the large overhead per event registration does not imply a large overall overhead during tracing.

The technique for detecting and excluding massively called functions during tracing offers an additional means of reducing the amount of captured function calls at tracing-time, i.e., when events are captured in a buffer in memory and before they are serialized to disk. The technique is applied during tracing multiple features of various industrially developed software systems. Thereby, different values for the massively called function threshold vmax are used. To be able to reproduce the execution scenarios so that the effect of different threshold values vmax for the detection of massively called functions can be compared, the fact was exploited that the instrumentation technique permits the activation of tracing at runtime by replacing binary code with standard debugging facilities. All execution scenarios are traced performing the following steps:

a. Execute the software within the Microsoft Visual Studio debugger and stop it via a breakpoint at the point in execution where tracing should be started.
b. Activate tracing by binary code instrumentation.
c. Execute and trace until a previously set stop breakpoint is hit.
d. Deactivate tracing by binary code instrumentation and examine the trace.

Example 1

Software System: Brec

Relevant characteristics of the software system brec by virtualcitySYSTEMS GmbH are given above. For the experiment, the same execution scenario as in the previous section is analyzed: reconstructing the first building in the test data set. However, this time the debug build of the system was used. Running this execution scenario with the debug build takes on the average 37.4 seconds.

Before tracing, all compiler generated functions and all functions from header files of 3rd party libraries such as the C++ standard template library (STL) were excluded. 2754 functions remain activated for tracing in all executed binary files, i.e., the executable file and the dll files it depends on. Without applying the technique for detecting and excluding massively called functions, the trace comprises 2.300.000.000 calls. The execution time of this run with only temporarily serializing the call entry and exit events to hard disk (cf. above), takes 91 minutes. Hence, recording all call events slows down the execution by a factor of 145.

Next, the technique for detecting and excluding massively called functions was applied. The time window Δt is set to 100.000.000 ticks. Table 6 shows the tracing characteristics for multiple executions with different values of the massively called function threshold vmax. The execution time reported here includes the time for deactivating massively called functions, i.e., stopping the execution and replacing call with NOP instructions. Hence, for decreasing vmax values an increasing amount of time is spent for deactivating the increasing number of massively called functions.

The prototypical tool analyzes and serializes the collected events in the in-memory buffers every second. During massively called function deactivation, which takes ≈0.5 s, all threads of the analyzed software system are suspended. Hence, the time value reported in Table 6 includes two kinds of performance overheads: (1) There is an overhead that results from the time delay between collecting events, detecting massively called functions, and deactivating them. Hence, there are many events corresponding to massively called functions first collected—with overhead for event collection and serialization—before this source of overhead is deactivated. (2) There is an overhead during the deactivation process itself: To prevent changing the binary code that is currently executed by a thread of the analyzed software system, all threads are suspended while changing the binary code.

TABLE 6

| $v_{max}$ | #Calls | #Massively called funcs | Execution time |
|---|---|---|---|
| ∞ | 2.300.000.000 | 0 | 5460 s |
| 200 | 65019 | 179 | 58 s |
| 150 | 55657 | 188 | 56 s |
| 100 | 38925 | 222 | 51 s |
| 50 | 20211 | 256 | 48 s |
| 25 | 13093 | 289 | 48 s |
| 12 | 5829 | 325 | 47 s |

To illustrate which functions are detected as massively called functions, Table 7 provides a list of excluded functions together with their v values.

TABLE 7

| v | Function |
|---|---|
| 6174 | bool SweepInfo::operator<(SweepInfo const &) |
| 5797 | double Constellation::Determ(double,double,double,double,double,double) |
| 5110 | double Vector3T<double>::operator[ ](int)const |
| 4819 | bool Vector3T<double>::operator==(Vector3T<double> const &)const |
| 4701 | std::vector<SamplePoint,std::allocator<SamplePoint> > & Cell:: SamplePoints(void) |
| 4071 | std::vector<Ring *,std::allocator< . . . > > const & GroundPlan::InnerRings(void)const |
| 3967 | Face * CSG::MergeFaces(Face *,Face *) |
| 3864 | double BuildingReconstructionProcess::Edge::EdgeDist(DPoint) |
| 3614 | bool IsPointInPolygon(Vector3T<double> const &,Face const *) |
| 3606 | double GetPixelFloat(IMAGE_PTR,double,double) |
| 3503 | DPoint & DPoint::operator-=(DPoint const &) |
| 3503 | void RectHouse::toLocal(DPoint &) |
| 3403 | Vector3T<double> SamplePoint::Position(void)const |
| 3388 | Triangulation3D const * Face::Triangulation(void)const |
| 3162 | IMAGE_PTR RecBuilding::show_dgmImage(void) |
| 2796 | Ring * Polygon:: OuterRing(void) |
| 2693 | Vector2T<double> BoundingRectangle::Min(void)const |
| 2535 | std::vector<Vector2T<double>,std::allocator< . . . > > & Cell::Points(void) |
| 2459 | bool Constellation::SetPixel(int,int,bool) |
| 2459 | bool IsrCnstlSetPixel(KBV_CONSTELLATION *,int,int,int) |
| 2431 | double & Vector3T<double>::operator[ ](int) |
| 2352 | double Line::distance_to(Vector3T<double> const &)const |
| 2250 | Face * CSG::MergeConvexFaces(Face *,Face *) |
| 2161 | float MinVec(float *,int) |
| 2046 | double dotProd(DPoint const &,DPoint const &) |
| 1963 | BuildingReconstructionProcess::Edge::Edge(DPoint,DPoint) |
| 1930 | BuildingReconstructionProcess::Edge::Edge(void) |
| 1927 | DPoint operator+(DPoint const &,DPoint const &) |
| 1904 | Vector3T<double>::~Vector3T<double>(void) |
| 1745 | DPoint * List<DPoint>::nextPtr(void) |
| 1666 | double CellDecomposition::LineBuffer::Significance(void)const |
| 1554 | IMAGE_PTR RecBuilding::show_dhmImage(void) |
| . . . | . . . |

Example 2

Software System: Google Chrome

The Google Chrome web browser is an open-source software system primarily developed by Google Inc. The code comprises 4 million lines-of-code. Thereof, 1.5 million code lines are written in C and C++. We instrument the Chrome executable of the debug configuration, 259145 different functions are contained in the executables (one executable and one dll file) and a can, hence, be activated for tracing.

For the measurements the scenario of rendering the homepage (http://www.google.com) of Google was examined, which involves 193.804 function calls and takes 0.015 seconds without tracing. The feature of setting breakpoints in a normal debugger was used to concisely define the part of execution to be traced.

Table 8 summarizes both resulting trace sizes and performance values for different threshold values vmax for the detection of massively called functions.

TABLE 8

| $v_{max}$ | #Calls | #Massively called funcs | Execution time |
| --- | --- | --- | --- |
| ∞ | 193804 | 0 | 2.3 s |
| 200 | 40672 | 18 | 1.7 s |
| 150 | 30942 | 20 | 1.7 s |
| 100 | 28974 | 26 | 1.8 s |
| 50 | 21519 | 36 | 1.8 s |
| 20 | 8273 | 66 | 1.8 s |

Example 3

Software System: Blender

The Blender software system developed by Not A Number B.V. and the Blender Foundation is a tool for creating, modeling and rendering 3D content. The system comprises 460.000 lines of C code. After instrumentation, 50803 functions are active for tracing. The analyzed execution scenario is adding a monkey geometry shape to the 3D scene. It takes 4.05 seconds to execute without tracing. Without using the technique for detecting massively called functions results in a trace consisting of 371.623.833 function calls. With the technique, a significant reduction of trace size and performance overhead can be achieved. Table 9 summarizes the reductions given different threshold values vmax.

TABLE 9

| $v_{max}$ | #Calls | #Massively called funcs | Execution time |
| --- | --- | --- | --- |
| 240 | 5.361.829 | 82 | 158 s |
| 200 | 4.278.518 | 88 | 127 s |
| 150 | 2.705.097 | 112 | 85 s |
| 100 | 2.291.174 | 151 | 78 s |
| 50 | 414.330 | 277 | 14 s |
| 10 | 138.757 | 543 | 12 s |

Example 4

Software System: LandXplorer

The LandXplorer software system by Autodesk Inc., which has been integrated into Autodesk Inc., is a software solution for processing and visualizing large geodata sets. It comprises 1.1 million lines of C++ code. After instrumentation, 504432 functions are active for tracing. The scenario of loading a specific terrain data file into a LandXplorer project is examined. This execution scenario comprises 621.162.948 calls and takes 3.1 seconds to execute without tracing. Table 10 shows the characteristics of captured traces for different applied threshold values vmax.

TABLE 10

| $v_{max}$ | #Calls | #Massively called funcs | Execution time |
| --- | --- | --- | --- |
| 200 | 41978 | 31 | 9.3 s |
| 100 | 36642 | 36 | 8.1 s |
| 36 | 21329 | 84 | 7.9 s |
| 5 | 6419 | 320 | 6.3 s |

The features disclosed in this specification, the figures and or the claims may be material for the realization of the invention in its various embodiments, taken in isolation or in various combinations thereof.

The invention claimed is:

1. A method for automatically generating a trace data set for a software system on a computer system, the method comprising steps of:
   providing a software system comprising a source code,
   providing a binary code by compiling the source code, wherein the step of compiling comprises a step of inserting a plurality of tracing instructions into the binary code, each of the tracing instructions configured to initiate trace data generation during runtime of the software system,
   providing a modified binary code by modifying the binary code, wherein the step of modifying comprises a step of replacing at least one tracing instruction of the plurality of tracing instructions with a neutral instruction, and
   running the modified binary code, wherein the step of running comprises steps of:
      running the modified binary code without recording trace data until an execution point of interest is reached,
      during the running of the modified binary code, activating trace data generation by re-replacing the neutral instruction with the at least one tracing instruction, and
      recording a trace data set, the step of recording being initiated by the at least one tracing instruction.

2. The method according to claim 1, wherein the step of inserting a plurality of tracing instructions comprises a step of inserting a plurality of call instructions into the binary code.

3. The method according to claim 1, wherein the step of inserting a plurality of tracing instructions comprises a step of inserting each of the tracing instructions at the beginning of a part of the binary code assigned to a function.

4. The method according to claim 1, wherein the step of replacing at least one tracing instruction comprises a step of replacing the at least one tracing instruction of the plurality of tracing instructions by a NOP instruction.

5. The method according to claim 1, wherein the step of modifying the binary code comprises, prior to the step of replacing, a step of receiving a user selection for the at least one tracing instruction of the plurality of tracing instructions.

6. The method according to claim 1, wherein the step of activating trace data generation comprises a step of using one or more debugger facilities for replacement of the at least one tracing instruction of the plurality of tracing instructions.

7. The method according to claim 1, wherein the step of replacing the neutral instruction with the at least one tracing instruction comprises the following steps of:
   checking for a process thread having its instruction pointer pointing at a neutral process instruction, and
   if the instruction pointer is pointing at the neutral process instruction, stepping forward the process thread until its instruction pointer is no longer pointing at the neutral process instruction.

8. The method according to claim 1, wherein the step of running the modified binary code further comprises steps of:
   performing an analysis of a present trace data set,
   deriving a characterizing parameter from the analysis, the characterizing parameter assigned to the tracing instruction or at least one other tracing instruction out of the plurality of tracing instructions, comparing the characterizing parameter against a threshold criterion also assigned to the at least one tracing instruction and/or the at least one other tracing instruction, and if the characterizing parameter fulfills the threshold criterion, excluding the at least one tracing instruction or the at least one other tracing instruction from further trace data generation.

9. The method according to claim 8, wherein the step of excluding comprises a step of replacing the at least tracing instruction or the at least one other tracing instruction by the neutral instruction or another neutral instruction.

10. The method according to claim 8, wherein the step of performing the analysis comprises a step of performing a statistical analysis of the present trace data set, thereby, deriving a statistical parameter for the at least tracing instruction or the at least one other tracing instruction.

11. The method according to claim 10, wherein the step of deriving the statistical parameter comprises a step of deriving a frequency of processing parameter for the tracing instruction.

12. The method according to claim 8, wherein the step of comparing the characterizing parameter comprises a step of identifying a function implementation data set assigned to the at least one tracing instruction or the at least one other tracing instruction as a massively called function implementation data set if the characterizing parameter fulfills the threshold criterion.

13. The method according to claim 8, further comprising a step of dynamically deriving the threshold criterion during runtime of the binary code.

14. The method according to claim 8, wherein the step of performing the analysis comprises a step of classifying at least two tracing instructions of the plurality of tracing instructions by:

identifying a first class of one or more first tracing instructions and assigning a first threshold criterion to the first class, and identifying a second class of one or more second tracing instructions different from the one or more first tracing instructions and assigning a second threshold criterion different from the first threshold criterion to the second class.

15. A computer system for automatically generating a trace data set for a software system, the computer system comprising:

a software system comprising a source code, an compiler module configured to provide a binary code by compiling the source code and to insert into the binary code a plurality of tracing instructions, each of the tracing instructions configured to initiate trace data generation during runtime of the software system, a modification module configured to provide a modified binary code by modifying the binary code and to replace at least one tracing instruction of the plurality of tracing instructions with a neutral instruction, and a computer processor configured to run the modified binary code, wherein the computer processor is further configured to:

run the modified binary code without recording trace data until an execution point of interest is reached, during the run of the modified binary code, activate trace data generation by re-replacing the neutral instruction with the at least one tracing instruction, and record a trace data set, the step of recording being initiated by the at least one tracing instruction.

16. A computer program product for automatically generating a trace data set for a software system on a computer system, the product comprising:

means recorded on a non-transitory electronic data carrier for providing a software system comprising a source code, means recorded on a non-transitory electronic data carrier for providing a binary code by compiling the source code, wherein the step of compiling comprises a step of inserting a plurality of tracing instructions into the binary code, each of the tracing instructions configured to initiate trace data generation during runtime of the software system, means recorded on a non-transitory electronic data carrier for providing a modified binary code by modifying the binary code, wherein the step of modifying comprises a step of replacing at least one tracing instruction of the plurality of tracing instructions with a neutral instruction, and means recorded on a non-transitory electronic data carrier for running the modified binary code, the means further comprising:

means recorded on a non-transitory electronic data carrier for running the modified binary code without recording trace data until an execution point of interest is reached, means recorded on a non-transitory electronic data carrier for activating trace data generation by re-replacing the neutral instruction with the at least one tracing instruction during the running of the modified binary code, and means recorded on a non-transitory electronic data carrier for recording a trace data set, the step of recording being initiated by the at least one tracing instruction.

* * * * *